(12) United States Patent
David et al.

(10) Patent No.: US 11,175,017 B2
(45) Date of Patent: Nov. 16, 2021

(54) SYSTEM AND METHOD FOR PRODUCING A BLENDING LIGHT DISTRIBUTION FROM LED LUMINAIRES

(71) Applicant: Robe Lighting s.r.o., Roznov pod Radhostem (CZ)

(72) Inventors: Tomas David, Podoli (CZ); Jan Vilem, Vsetin (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 17/084,295

(22) Filed: Oct. 29, 2020

(65) Prior Publication Data

US 2021/0048172 A1 Feb. 18, 2021

Related U.S. Application Data

(60) Provisional application No. 62/928,984, filed on Oct. 31, 2019.

(51) Int. Cl.
*F21V 5/04* (2006.01)
*F21V 14/06* (2006.01)
(Continued)

(52) U.S. Cl.
CPC ............ *F21V 14/06* (2013.01); *F21S 10/007* (2013.01); *F21V 5/045* (2013.01); *F21V 23/003* (2013.01); *G02B 6/0078* (2013.01)

(58) Field of Classification Search
CPC ......... F21V 14/06; F21V 5/046; F21S 10/026
See application file for complete search history.

(56) References Cited

U.S. PATENT DOCUMENTS 2,254,962 A * 9/1941 Bitner .................. F21V 7/0091
362/327
3,708,221 A 1/1973 Schaefer
(Continued)

FOREIGN PATENT DOCUMENTS

| EP | 2112425 A1 | 10/2009 |
| JP | H07174974 A | 7/1995 |
| WO | 2017165685 A1 | 9/2017 |

OTHER PUBLICATIONS

European Extended Search Report; Applicatio No. 20204887.2; dated Mar. 31, 2021; 8 pages.

*Primary Examiner* — Julie A Bannan
(74) *Attorney, Agent, or Firm* — Conley Rose, P. C.; Brooks W Taylor

(57) ABSTRACT

An optical system and luminaire are provided that include a light source and a beam adjuster optical element (BAOE). The light source emits a source light beam that is received by the BAOE, which emits an adjusted light beam. The BAOE includes an outer portion that receives an outer portion of the source light beam and causes light rays of the outer portion to diverge in a corresponding outer portion of the adjusted light beam and an inner portion that receives an inner portion of the source light beam and causes light rays of the inner portion to converge in a corresponding inner portion of the adjusted light beam. The luminaire includes an actuator that moves the BAOE within the luminaire and a control system that receives a control signal via a data link and moves the BAOE in response to the control signal.

10 Claims, 9 Drawing Sheets

(51) Int. Cl.
*F21V 23/00* (2015.01)
*F21V 8/00* (2006.01)
*F21S 10/00* (2006.01)

(56) References Cited

U.S. PATENT DOCUMENTS

| | | | |
|---|---|---|---|
| 5,775,799 A | 7/1998 | Forkner | |
| 6,123,436 A | 9/2000 | Hough et al. | |
| 7,448,774 B2* | 11/2008 | Konuma | G03B 27/545 |
| | | | 359/728 |
| 7,934,858 B2* | 5/2011 | Nakamura | G02B 19/0028 |
| | | | 362/311.09 |
| 8,220,958 B2* | 7/2012 | Montagne | G02B 19/0014 |
| | | | 362/235 |
| 8,662,713 B2* | 3/2014 | Kim | G02B 27/0955 |
| | | | 362/311.02 |
| 8,820,963 B2 | 9/2014 | Olsen et al. | |
| 9,588,402 B2 | 3/2017 | Baxter et al. | |
| 2009/0225552 A1* | 9/2009 | Chen | G02B 19/0028 |
| | | | 362/333 |
| 2009/0303723 A1* | 12/2009 | Cavenati | F21V 14/06 |
| | | | 362/268 |
| 2010/0097802 A1 | 4/2010 | Jurik | |
| 2011/0317414 A1* | 12/2011 | Marfeld | G02B 19/0066 |
| | | | 362/235 |
| 2012/0140463 A1 | 6/2012 | Kinzer et al. | |
| 2014/0036510 A1 | 2/2014 | Preston et al. | |
| 2016/0238217 A1* | 8/2016 | Latteo | F21V 17/02 |
| 2017/0084802 A1* | 3/2017 | Chiu | F21V 7/0091 |
| 2017/0205051 A1* | 7/2017 | JOrgensen | F21V 5/04 |
| 2018/0216798 A1* | 8/2018 | Broughton | F21V 5/007 |
| 2020/0083417 A1* | 3/2020 | Streppel | G03B 15/05 |

* cited by examiner

SYSTEM AND METHOD FOR PRODUCING A BLENDING LIGHT DISTRIBUTION FROM LED LUMINAIRES

CROSS-REFERENCE TO RELATED APPLICATIONS

This application claims priority to U.S. Provisional Application No. 62/928,984 filed Oct. 31, 2019 by Tomas David, et al. entitled, "System and Method for Producing a Blending Light Distribution from LED Luminaires", which is incorporated by reference herein as if reproduced in its entirety.

TECHNICAL FIELD OF THE DISCLOSURE

The disclosure generally relates to LED luminaires, and more specifically to a method for producing a blending light distribution from light-emitting diode (LED) based luminaires.

BACKGROUND

Luminaires utilizing LED light sources have become well known in the entertainment and architectural lighting markets. Such products are commonly used in theatres, television studios, concerts, theme parks, night clubs, and other venues. These LED luminaires may be static or automated luminaires. A typical static LED luminaire will commonly provide control over the intensity of the luminaire. A typical automated luminaire product will additionally commonly provide control over the pan and tilt functions of the luminaire allowing the operator to control the direction the luminaire is pointing and thus the position of the light beam on the stage or in the studio. Typically, this position control is done via control of the luminaire's position in two orthogonal rotational axes usually referred to as pan and tilt. Many products provide control over other parameters such as the intensity, focus, beam size, beam shape, and beam pattern.

SUMMARY

In a first embodiment, an optical system includes a light source and a beam adjuster optical element. The light source emits a source light beam. The beam adjuster optical element receives the source light beam and emits an adjusted light beam. The beam adjuster optical element includes an outer portion and an inner portion. The outer portion receives an outer portion of the source light beam and causes light rays of the outer portion of the source light beam to diverge in a corresponding outer portion of the adjusted light beam. The inner portion receives an inner portion of the source light beam and causes light rays of the inner portion of the source light beam to converge in a corresponding inner portion of the adjusted light beam.

In a second embodiment, an optical system includes a light source and a beam adjuster optical element. The light source emits a source light beam. The beam adjuster optical element receives the source light beam and emits an adjusted light beam. The beam adjuster optical element includes an outer portion and an inner portion. The outer portion receives an outer portion of the source light beam and has a negative optical power. The inner portion receives an inner portion of the source light beam and has a positive optical power.

In a third embodiment, a luminaire includes a light source, a beam adjuster optical element, an actuator, and a control system. The light source emits a source light beam. The beam adjuster optical element receives the source light beam and emits an adjusted light beam. The beam adjuster optical element includes an outer portion and an inner portion. The outer portion receives an outer portion of the source light beam and causes light rays of the outer portion of the source light beam to diverge in a corresponding outer portion of the adjusted light beam. The inner portion receives an inner portion of the source light beam and causes light rays of the inner portion of the source light beam to converge in a corresponding inner portion of the adjusted light beam. The actuator is mechanically coupled to the beam adjustor optical element and moves the beam adjustor optical element within the luminaire. The control system is electrically coupled to the actuator, receives a control signal via a data link, and moves the beam adjustor optical element in response to the control signal.

In a fourth embodiment, a luminaire includes a light source, a beam adjuster optical element, an actuator, and a control system. The light source emits a source light beam. The beam adjuster optical element receives the source light beam and emits an adjusted light beam. The beam adjuster optical element includes an outer portion and an inner portion. The outer portion receives an outer portion of the source light beam and causes light rays of the outer portion of the source light beam to continue with unchanged vergence in a corresponding outer portion of the adjusted light beam. The inner portion receives an inner portion of the source light beam and causes light rays of the inner portion of the source light beam to converge in a corresponding inner portion of the adjusted light beam. The actuator is mechanically coupled to the beam adjustor optical element and moves the beam adjustor optical element to insert the beam adjuster optical element into the source light beam and to remove the beam adjuster optical element from the source light beam. The control system is electrically coupled to the actuator, receives a control signal via a data link, and moves the beam adjustor optical element in response to the control signal.

In a fifth embodiment, a luminaire includes a light source, a beam adjuster optical element, an actuator, and a control system. The light source emits a source light beam. The beam adjuster optical element receives the source light beam and emits an adjusted light beam. The beam adjuster optical element includes an outer portion and an inner portion. The outer portion receives an outer portion of the source light beam and causes light rays of the outer portion of the source light beam to diverge in a corresponding outer portion of the adjusted light beam. The inner portion receives an inner portion of the source light beam and causes light rays of the inner portion of the source light beam to continue with unchanged vergence in a corresponding inner portion of the adjusted light beam. The actuator is mechanically coupled to the beam adjustor optical element and moves the beam adjustor optical element to insert the beam adjuster optical element into the source light beam and to remove the beam adjuster optical element from the source light beam. The control system is electrically coupled to the actuator, receives a control signal via a data link, and moves the beam adjustor optical element in response to the control signal.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION

Preferred embodiments are illustrated in the figures, like numerals being used to refer to like and corresponding parts of the various drawings.

Figure 1:
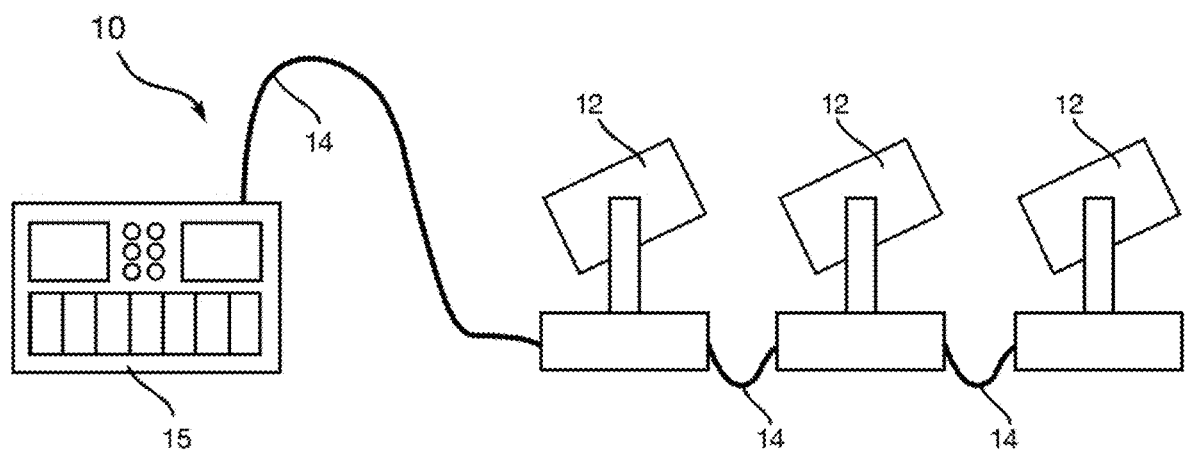
FIG. 1 presents a schematic view of a multiparameter automated luminaire system according to the disclosure.

FIG. 1 presents a schematic view of a multiparameter automated luminaire system 10 according to the disclosure. The multiparameter automated luminaire system 10 includes a plurality of automated luminaires 12 according to the disclosure. The automated luminaires 12 each contains onboard a light source, color changing devices, light modulation devices, pan and/or tilt systems to control an orientation of a head of the automated luminaire 12. Mechanical drive systems to control parameters of the automated luminaire 12 include motors or other suitable actuators coupled to control electronics, as described in more detail with reference to FIG. 9.

In addition to being connected to mains power either directly or through a power distribution system, each automated luminaire 12 is connected in series or in parallel by a data link 14 to one or more control desks 15. Upon actuation by an operator, the control desk 15 sends control signals via the data link 14, where the control signals are received by one or more of the automated luminaires 12. The one or more of the automated luminaires 12 that receive the control signals may respond by changing one or more of the parameters of the receiving automated luminaires 12. The control signals are sent by the control desk 15 to the automated luminaires 12 using DMX-512, Art-Net, ACN (Architecture for Control Networks), Streaming ACN, or other suitable communication protocol.

The automated luminaires 12 may include stepper motors to provide the movement for internal optical systems. Examples of such optical systems include gobo wheels, effects wheels, and color mixing systems, as well as prism, iris, shutter, and lens movement.

Where the automated luminaires 12 include LED light sources, the automated luminaires 12 may be referred to as automated LED luminaires. Where the automated luminaires 12 include LED light sources, but provide control over only an intensity of the LED source, the automated luminaires 12 may be referred to as static LED luminaires. Such a static LED luminaire is still remotely controllable, but the user has no control over, for example, the position of the unit. The present disclosure applies equally to moving automated LED luminaires or static LED luminaires.

Some LED luminaires (automated or static) include an LED based light source designed to collate and direct light through optical systems installed in the luminaire. The LED light sources, along with associated collimating and directing optics, may be referred to herein as a light engine. Some LED light engines include LEDs of a single color, such as white. Other LED light engines include LEDs of a range of colors, each LED or each color of LED controllable individually to provide additive mixing of the LED outputs.

Figure 2A:
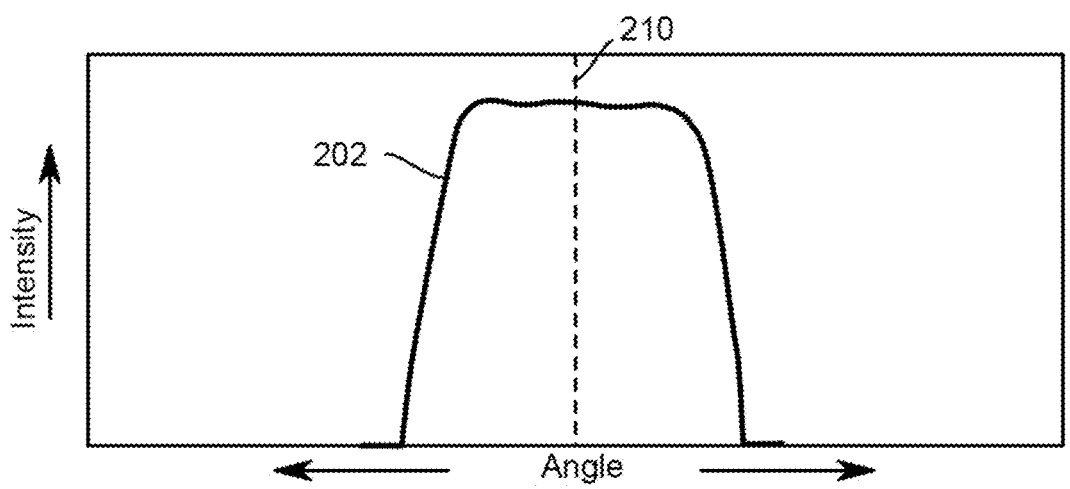
FIGS. 2A, 2B, and 2C present intensity light output diagrams for a typical LED luminaire.
Figure 2B:
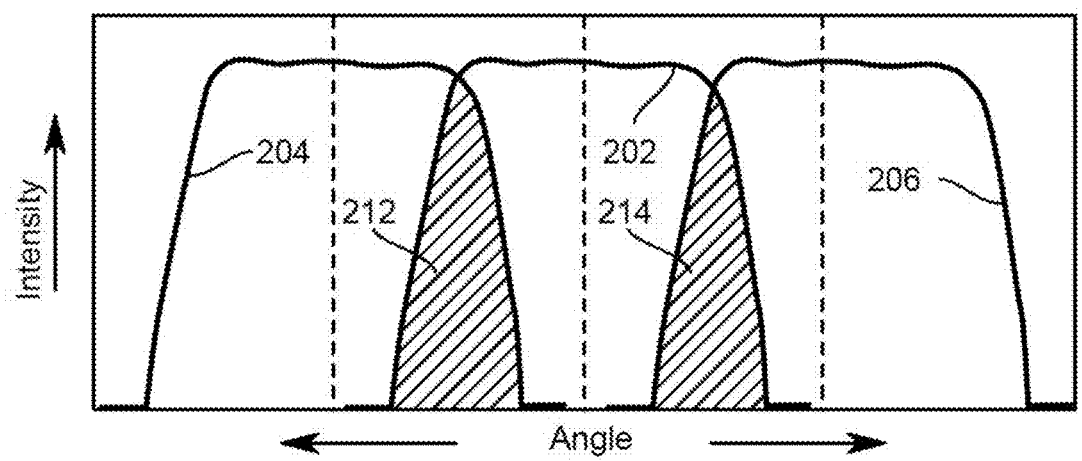
Figure 2C:
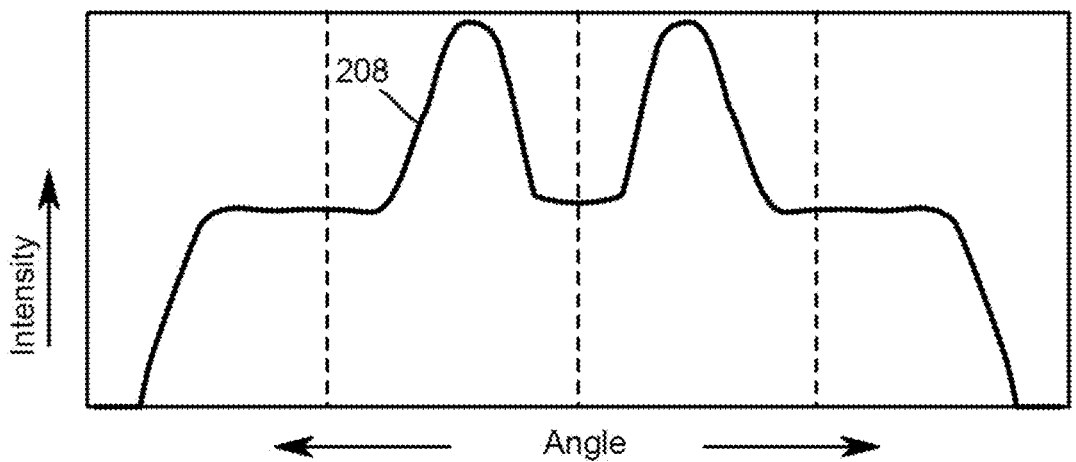

FIGS. 2A, 2B, and 2C present intensity light output diagrams for a typical LED luminaire. An LED light engine used in such luminaires will produce a light output from the luminaire with a profile as shown in FIG. 2A. Light profile 202 is plotted on a graph with beam angle along the x axis, and intensity along the y axis. The center line of the light beam is shown by dashed line 210. The light profile 202 is characterized as having a flat top with steeply sloped sides. A typical LED light engine may produce a flat beam where the center to edge ratio is between 1.2:1 and 2:1. This kind of light profile is suitable for projecting images or theatrical gobos and is often used for that purpose. However, if a number of such LED luminaires are arranged so as to align and wash light over a wider area, such as is shown in FIG. 2B, then the resulting combined illumination for the luminaires is not flat. FIG. 2B shows the light profiles 202, 204, and 206 from three such LED luminaires arranged and directed so as to illuminate a wide area. The overlap of these light beams is shown as shaded areas 212 and 214. FIG. 2C shows a light profile 208 of a resulting combined illumination as the sum of the light profiles 202, 204, and 206. Light profile 208 has large peaks where the original light beams overlap. The resultant beam is uneven and less suitable for a wash light across a wide area. The peaks are particularly noticeable to video cameras as uneven areas of illumination.

Figure 3A:
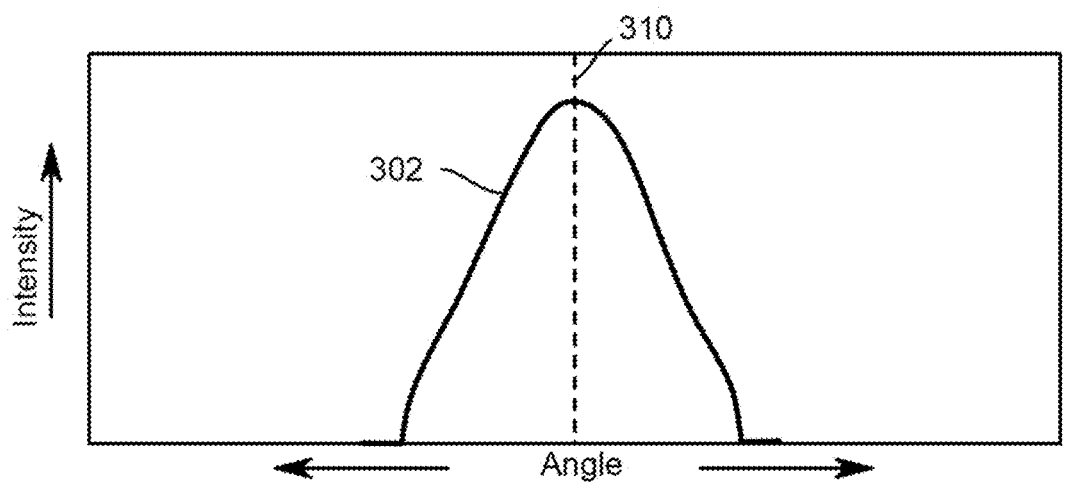
FIGS. 3A, 3B, and 3C present intensity light output diagrams for an LED luminaire according to the disclosure.
Figure 3B:
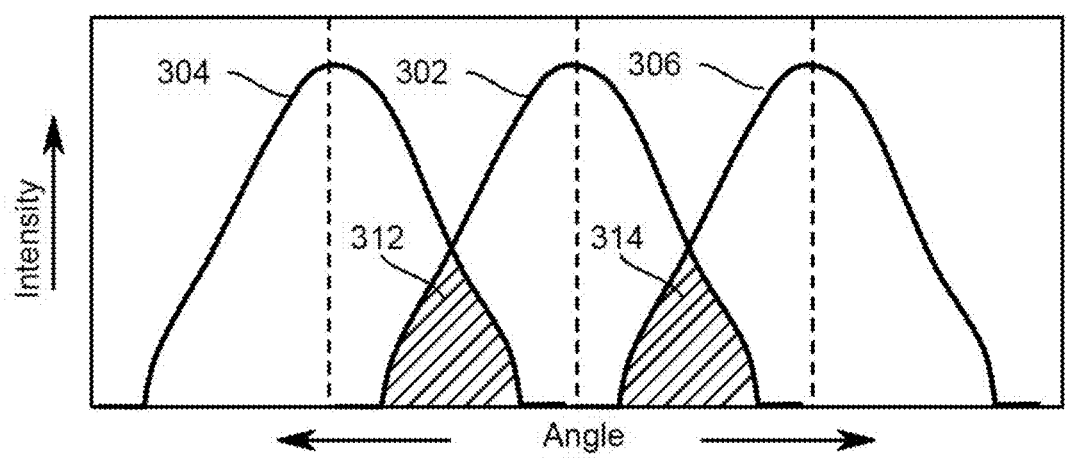
Figure 3C:
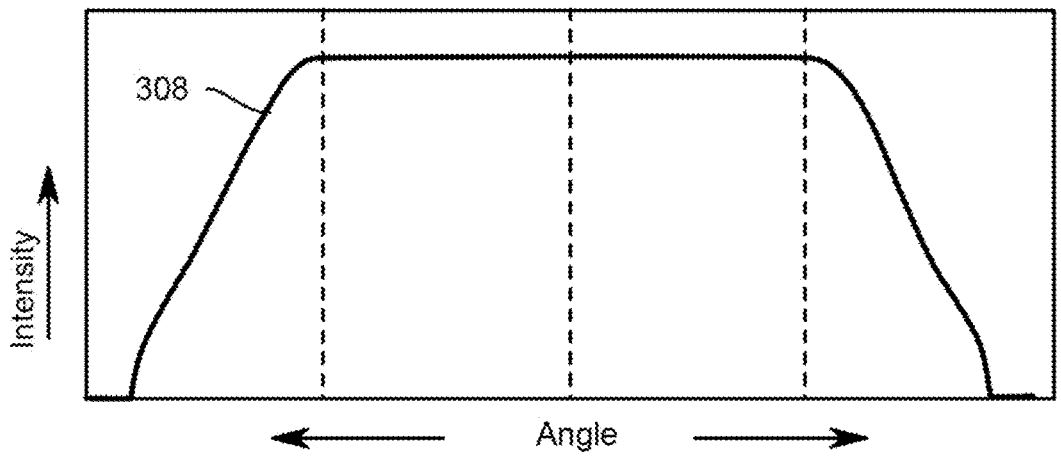

FIGS. 3A, 3B, and 3C present intensity light output diagrams for an LED luminaire according to the disclosure. FIG. 3A illustrates the output of a light engine which includes an embodiment of an optical device of the disclosure. FIG. 3A shows a light profile 302 plotted on the same axes as the profiles of FIGS. 2A-2C. The center line of the light beam is shown by dashed line 310. The light profile 302 does not have a flat top; instead it has sloping sides up to a single peak, which may be referred to as a hot-spot. The center to edge peak ratio of such a beam may be greater than 3:1, and preferably closer to 6:1. LED luminaires with this kind of light output may be overlapped as shown in FIG. 3B. FIG. 3B shows the light profiles 302, 304, and 306 from three such LED luminaires arranged so as to produce a wide-angle beam over a wide area. The overlap of these light beams is shown as shaded areas 312 and 314. FIG. 3C shows the resulting light profile 308 as the sum of the light profiles 302, 304, and 306. In this case the sloping sides overlap so as to sum to a distribution that is close to flat. The resultant beam is more even, more uniform, and more suitable for a wash light across a wide area. In some embodiments a flat distribution means a distribution where the light varies by no more than 50% from the center value. A light beam from a luminaire that is capable of being overlaid in this manner with the beams from adjacent luminaires to provide a resultant flat wash may be referred to as a having a "blending light distribution." A blending light distribution need not be precisely as depicted in FIG. 3A; in other embodiments it may have straight or curved sides, or resemble a cosine curve.

The light profiles of individual luminaires and the resulting light profiles of overlapped luminaires shown in FIGS. 2A-C and 3A-C may be further smoothed by the use of frost filters in the luminaires. However, even with the use of frost filters, the light profile 208 of FIG. 2C is not as smooth as the light profile 308 of FIG. 3.

Figure 4A:
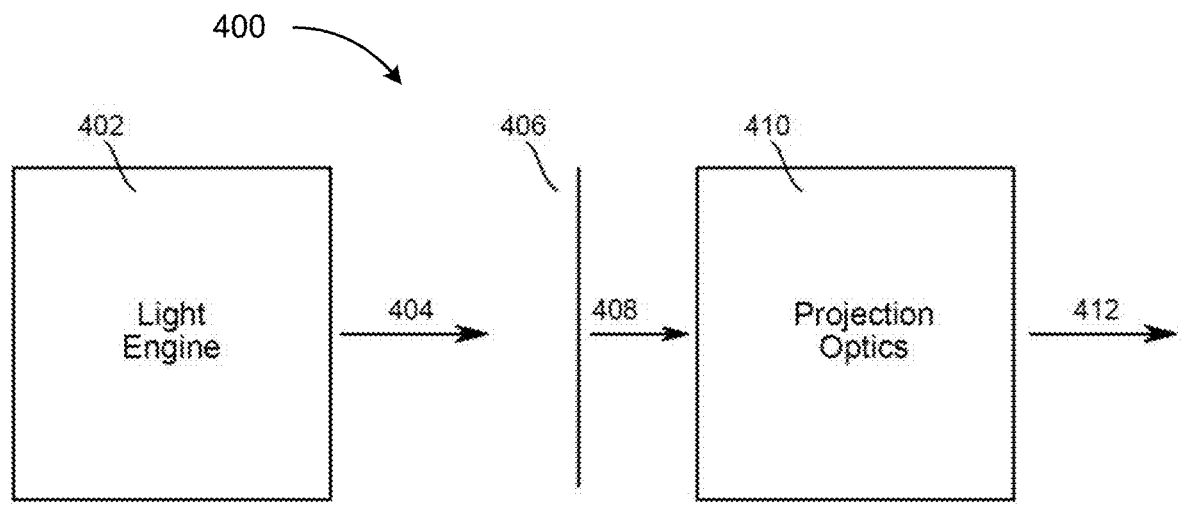
FIGS. 4A and 4B present schematic diagrams of alternative optical systems of LED luminaires.
Figure 4B:
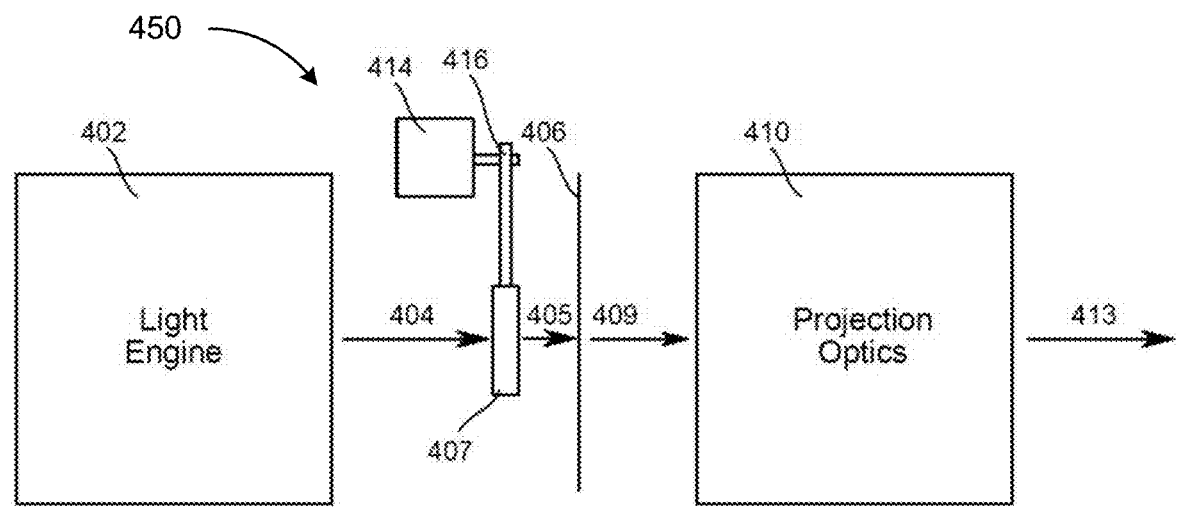

FIGS. 4A and 4B present schematic diagrams of alternative optical systems of LED luminaires. FIG. 4A illustrates an optical system 400 of an LED luminaire that produces the distribution shown in FIGS. 2A-2C. FIG. 4B illustrates an optical system 450 of an LED luminaire according to the disclosure that produces the distribution shown in FIGS. 3A-3C.

The optical system 400 includes an LED light engine 402 that emits a light beam 404 through an image focus plane 406, which proceeds onwards as a light beam 408 to projection optics 410. The projection optics 410 projects an output light beam 412. In some configurations, an image of a pattern, iris, or other object in the image focus plane 406 is projected by the output light beam 412. The beam distribution from such an optical system may be flat, as shown and described with reference to FIG. 2A.

FIG. 4B shows the optical system 450, which includes the LED light engine 402 emitting the light beam 404. In the optical system 450, the light beam 404 passes through a beam adjuster optical element 407 according to the disclosure, which produces a light beam 405 that passes through the image focus plane 406 and then onwards as a light beam 409 to the projection optics 410. The projection optics 410 projects an output light beam 413. In some configurations, an image of a pattern, iris, or other object in the image focus plane 406 may be projected by the output light beam 413.

The beam distribution from the optical system 450 is a blending light distribution of the type shown and described with reference to FIGS. 3A-3C. The beam adjuster optical element 407 modifies the flat light profile 202 of the light beam 404 coming from the LED light engine 402 and converts it to a blending light profile 302 (or blending light distribution) of the light beam 405. In some embodiments, this is achieved by redirecting light from the edges of the beam towards the center, thus creating a light beam with a more peaky distribution. Because of this redirection of light from the edges of the beam to the center, the peak intensity of the light profile 302 (shown in FIG. 3A) may be greater than the peak intensity of the light profile 202 (shown in FIG. 2A). Similarly, redirection of light from the edges of the beam to the center may result in the peak intensity of the combined light profile 308 (shown in FIG. 3C) being greater than the peak intensity of the combined light profile 208 (shown in FIG. 2C).

In the optical system 450, the beam adjuster optical element 407 is mechanically coupled to a movement system comprising a motor 414 (or other actuator) and an arm 416, by which the beam adjuster optical element 407 is removed or inserted into the light beam 404 in response to one or more control signals received via the data link 14.

Figure 5:
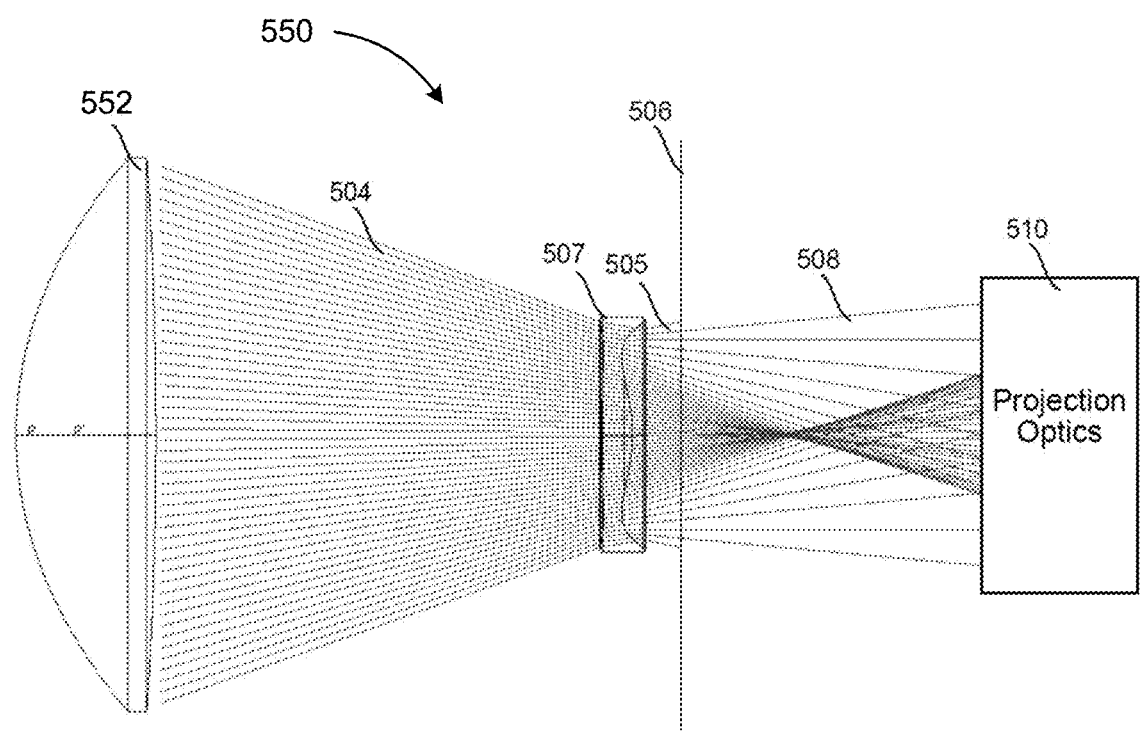
FIG. 5 presents a ray trace diagram from an optical system according to the disclosure.

FIG. 5 presents a ray trace diagram from an optical system 550 according to the disclosure. A light beam 504 is emitted from an output lens 552 of an LED light engine. The light beam 504 passes through a beam adjuster optical element 507, where it is modified into a light beam 505 before passing through an image focus plane 506 and emerging as a light beam 508 towards projection optics 510. It can be seen from the traces of rays in the light beams 505 and 508 of FIG. 5 that the beam adjuster optical element 507 redirects the evenly spaced light rays of the light beam 504 (which has a flat distribution) into a beam that is more concentrated towards the center of the beam and away from the edge of the beam (i.e., a light beam that has a hot-spot distribution). Beam adjuster optical element 507 performs as a converging element for optical rays in the center portion of the light beam 504, and as a diverging element for beams in the outer portion of the light beam 504.

In some embodiments, the center 50% of the diameter of the light beam 504 is converged and the outer (or edge) 50% of the diameter is diverged. In various other embodiments, the center to edge diameter ratio may be between 25%:75% and 75%:25%. The center to edge diameter ratio and/or the optical powers of the converging and diverging portions of a beam adjuster optical element according to the disclosure may be selected by an optical system designer based on a desired center to edge ratio in the beam. In some embodiments of the disclosure the center to edge ratio of the light beam 505 or 508 after passing through the beam adjuster optical element 507 is 6:1, however the disclosure is not so limited and center to edge ratios from 3:1 to 7:1 may be achieved and utilized.

Figure 6A:
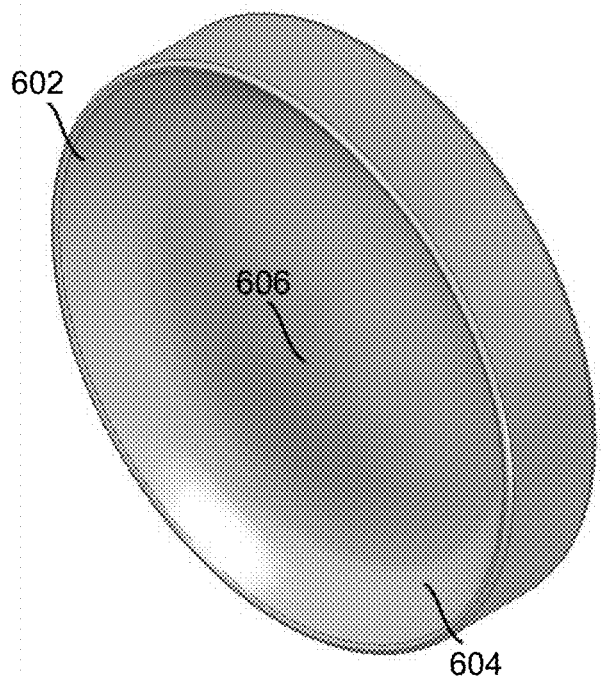
FIGS. 6A, 6B, and 6C present isometric and cross-sectional views of a beam adjuster optical element according to the disclosure.
Figure 6B:
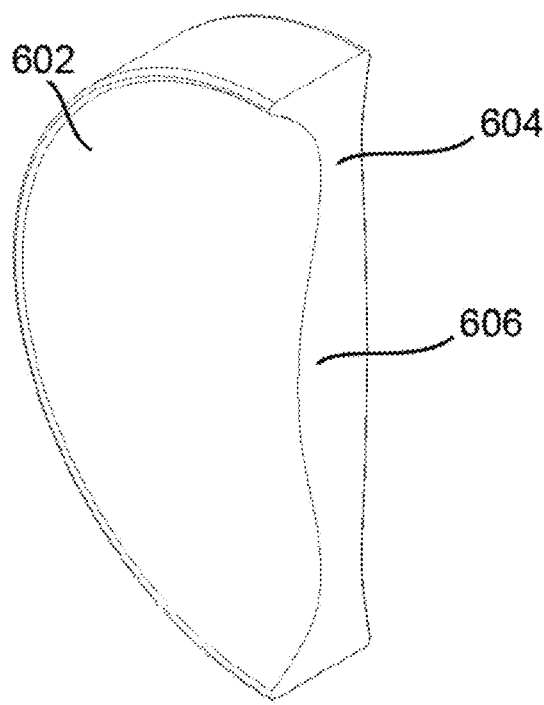
Figure 6C:
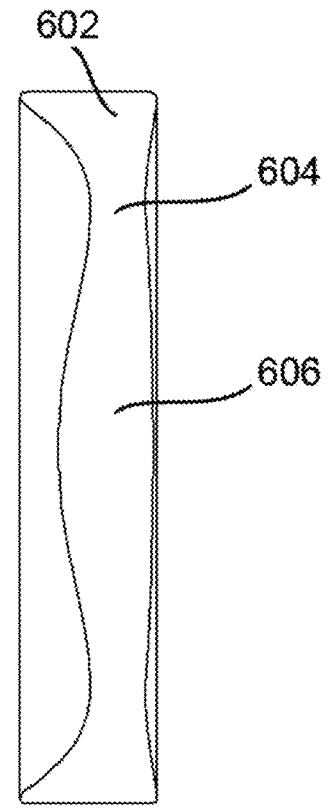

FIGS. 6A, 6B, and 6C show isometric and cross-sectional views of a beam adjuster optical element 602 according to the disclosure. In this embodiment, the beam adjuster optical element (or lens) 602 comprises a free-form lens, manufactured of glass or other optical material such as polycarbonate, PMMA (polymethylmethacrylate), or any other suitable optical material used in lens manufacture. The lens 602 is manufactured so as to have a center portion 606 having a positive (or zero) optical power, which acts to converge light rays passing through it (or to leave their vergence unchanged), and an outer portion 604 having a negative optical power, which acts to diverge light rays passing through it. In the lens 602, the converging center portion 606 has a convex-convex shape and the diverging outer portion 604 has a concave-concave shape.

In other embodiments, the center portion 606 may have a plano-convex shape or any other positive optical power lens shape. Similarly, in other embodiments, the outer portion 604 may have a plano-concave shape or any other negative power lens shape. In still other embodiments, one or the other of the center portion 606 or the outer portion 604 may have a plano-plano shape with an optical power of zero that leaves unchanged the angle of light rays passing through it (i.e., leaves their vergence unchanged), but offsets the light rays relative to an axis of the light beam passing through the beam adjuster optical element 602. In a first of such embodiments, a negative power outer portion 604 may be combined with a zero power center portion 606. In a second of such embodiments, a zero power outer portion 604 is combined with a positive power center portion 606, or a positive power lens having a smaller diameter than the light beam may be positioned in a center portion of the beam, with the outer portion of the beam bypassing the small positive power lens.

Figure 7A:
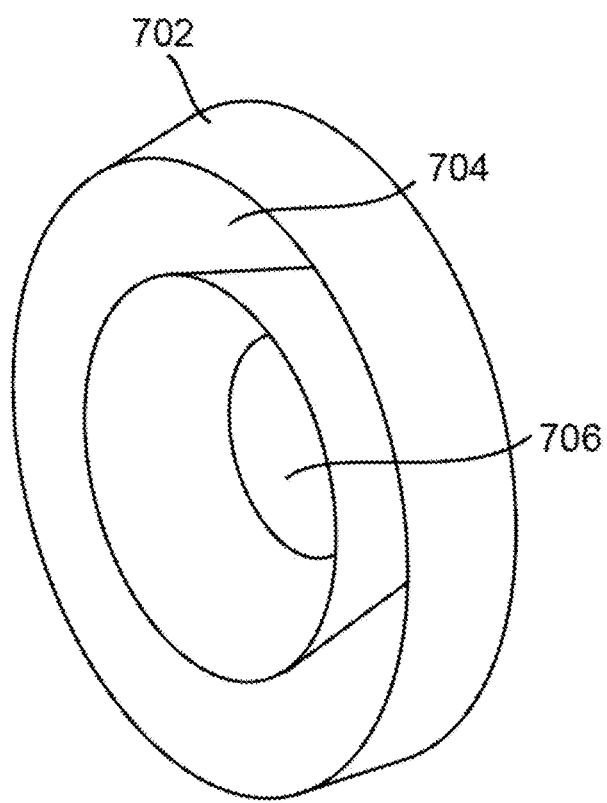
FIGS. 7A and 7B present isometric and cross-sectional views of a second beam adjuster optical element according to the disclosure.
Figure 7B:
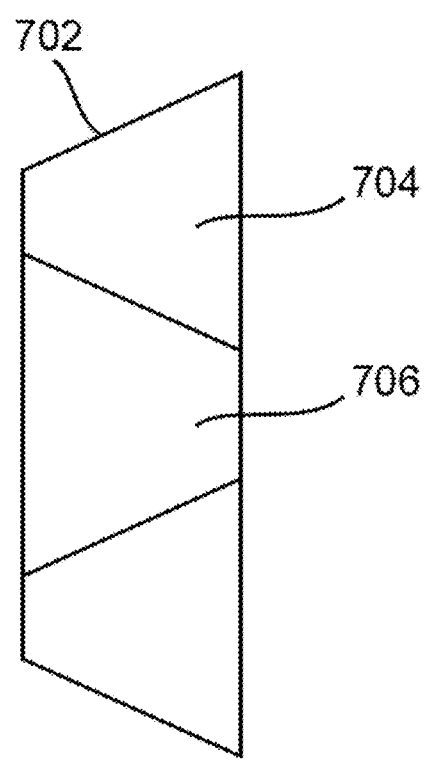

FIGS. 7A and 7B present isometric and cross-sectional views of a second beam adjuster optical element 702 according to the disclosure. In this embodiment, the beam adjuster optical element 702 comprises reflective light guides, manufactured of aluminum or other reflective material. The beam adjuster optical element 702 has a center light guide 706 that increases in diameter as light passes through it, thus acting to converge light rays. The beam adjuster optical element 702 has an outer light guide 704 that decreases in diameter (or cross-section) as light passes through it, thus acting to diverge light rays. An outer wall of the center light guide 706 forms an inner wall of the outer light guide 704. Other such embodiments may use solid total internal reflection (TIR) elements instead of reflective light guides.

Figure 8A:
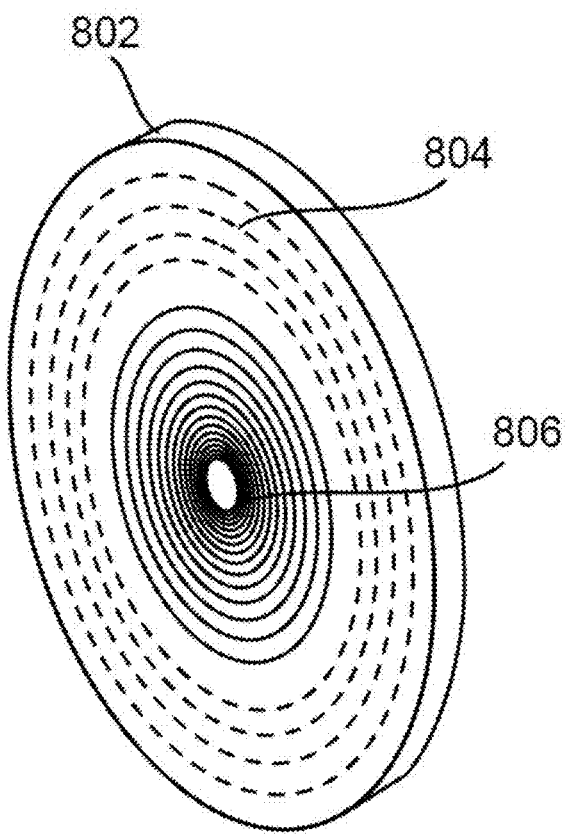
FIGS. 8A and 8B present isometric and cross-sectional views of a third beam adjuster optical element according to the disclosure.
Figure 8B:
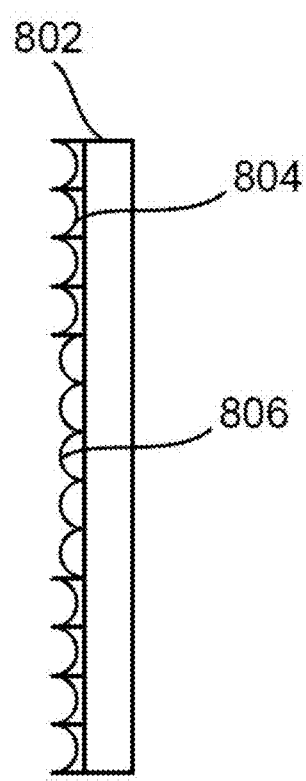

FIGS. 8A and 8B present isometric and cross-sectional views of a third beam adjuster optical element 802 according to the disclosure. The beam adjuster optical element (or lens) 802 comprises a dual Fresnel (or annular lenticular) lens, manufactured of glass or other optical material such as polycarbonate, PMMA or any other suitable optical material used in lens manufacture. The lens 802 is manufactured with a plano-convex center Fresnel portion 806 having a positive optical power, which acts to converge light rays passing through it, and a plano-concave outer Fresnel portion 804 having a negative optical power, which acts to diverge light rays passing through it. In other embodiments, the center Fresnel portion 806 may have an annular lenticular lens on both faces of the beam adjuster optical element 802, forming a positive power Fresnel shape. Similarly, in other embodiments, the outer Fresnel portion 804 may have an annular lenticular lens on both faces, forming a negative power Fresnel shape. The cross-sectional shapes of the facets shown in FIG. 8B are only illustrative, and it will be understood that an annular lenticular lens having facets of any suitable cross-section on one or both sides may be used in other embodiments of the disclosure.

As described for the beam adjuster optical element 602, in other embodiments the beam adjuster optical element 802 may comprise a negative power outer portion 804 and a zero power center portion 806. In still other embodiments, the beam adjuster optical element 802 may comprise a zero power outer portion 804 and a positive power center portion 806, or a positive power annular lenticular lens having a smaller diameter than the light beam, which is positioned in a center portion of the beam, with the outer portion of the beam bypassing the small annular lenticular lens.

The examples of embodiments of the beam adjuster optical element disclosed herein are not limiting, and other optical devices which are configured to redirect light from the edges of the beam towards the center are considered to be part of the disclosure.

In some embodiments, a beam adjuster optical element according to the disclosure may be permanently installed in a luminaire. In other embodiments, when used in an automated luminaire, the beam adjuster optical element may be mounted on a movement system for motion into and out of the light beam in response to control signals received by the luminaire via a data link from an external device. For example, in the optical system 450 of FIG. 4B, the beam adjuster optical element 407 is mounted on a motorized arm 416 for movement in and out of the light beam 404. In other embodiments, the beam adjuster optical element 407 may be mounted in a static or rotating gobo wheel. In still other embodiments, the beam adjuster optical element 407 is fixedly mounted in the light beam 404.

In some embodiments, a preferred position for the beam adjuster optical element is at or close to the image focus plane 406 of the luminaire. While FIG. 4B discloses an embodiment in which the beam adjuster optical element 407 may be moved into or out of the light beam 404, in other embodiments the beam adjuster optical element 407 may additionally or alternately be moved along an optical axis of the light beam 404 to be at a user-controlled distance from the image focus plane 406.

While the embodiments described herein are shown in a projection (or focusing, or spot) luminaire, the disclosure is not so limited. In other embodiments a beam adjuster optical element according to the disclosure may be used in wash or beam luminaires. In such embodiments, the beam adjuster optical element is positioned after the LED light engine (which might comprise light pipes, condensing lenses, light tubes or other collimating optical systems) and before any focal plane, real or virtual, or projection optics of the wash or beam luminaire.

Figure 9:
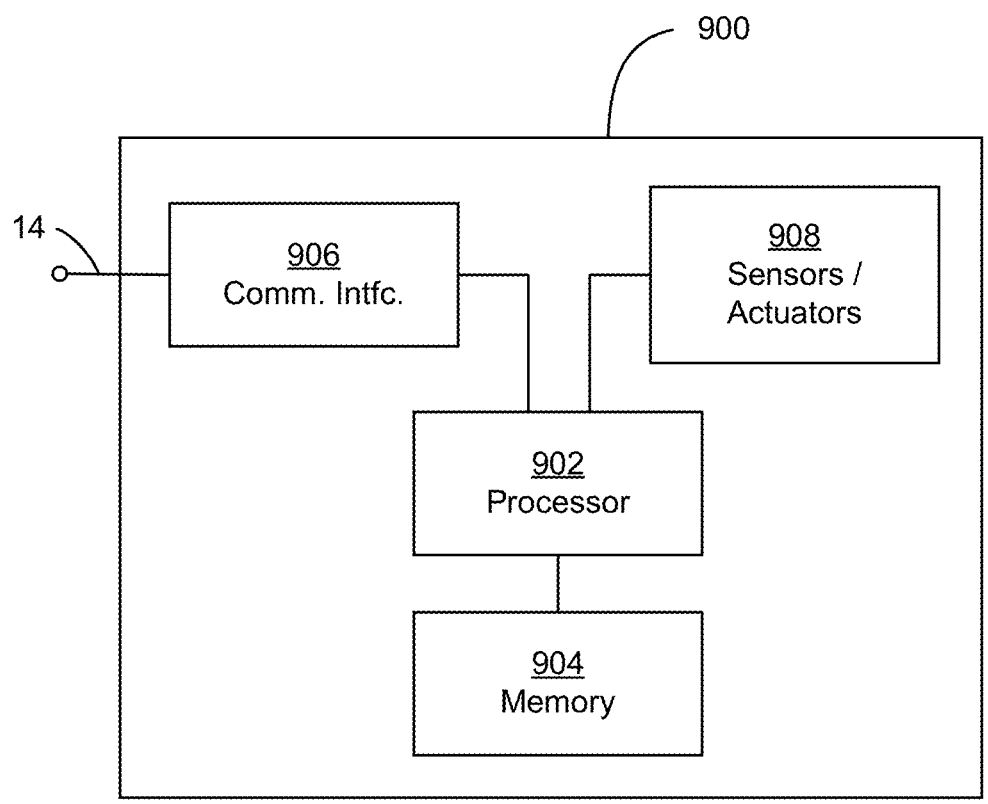
FIG. 9 presents a block diagram of a control system for an automated luminaire according to the disclosure.

FIG. 9 presents a block diagram of a control system (or controller) 900 for an automated luminaire 12 according to the disclosure. The control system 900 is suitable for use to control the light source, color changing devices, light modulation devices, pan and/or tilt systems, beam adjuster optical element(s), and other systems of one of the automated luminaires 12 according to the disclosure. The control system 900 is also suitable for controlling other control functions of one of the automated luminaires 12.

The control system 900 includes a processor 902 electrically coupled to a memory 904. The processor 902 is implemented by hardware and software. The processor 902 may be implemented as one or more Central Processing Unit (CPU) chips, cores (e.g., as a multi-core processor), field-programmable gate arrays (FPGAs), application specific integrated circuits (ASICs), and digital signal processors (DSPs).

The processor 902 is further electrically coupled to and in communication with a communication interface 906. The communication interface 906 is coupled to, and configured to communicate via, the data link 14. The processor 902 is also coupled via a control interface 908 to one or more sensors, motors, actuators, controls and/or other devices. The processor 902 is configured to receive control signals from the data link 14 via the communication interface 906 and, in response, to control systems and mechanisms of the automated luminaire 12 via the control interface 908.

The control system 900 is suitable for implementing processes, beam adjuster optical element movement, motor control, and other functionality as disclosed herein, which may be implemented as instructions stored in the memory 904 and executed by the processor 902. The memory 904 comprises one or more disks and/or solid-state drives and may be used to store instructions and data that are read and written during program execution. The memory 904 may be volatile and/or non-volatile and may be read-only memory (ROM), random access memory (RAM), ternary content-addressable memory (TCAM), and/or static random-access memory (SRAM).

While only some embodiments of the disclosure have been described herein, those skilled in the art, having benefit of this disclosure, will appreciate that other embodiments may be devised which do not depart from the scope of the disclosure. While the disclosure has been described in detail, it should be understood that various changes, substitutions and alterations can be made hereto without departing from the spirit and scope of the disclosure.

What is claimed is:

1. An optical system comprising:
    a light source emitting a converging source light beam; and
    a beam adjuster optical element configured to receive the source light beam and to emit an adjusted light beam having a center to edge ratio in the range 3:1 to 7:1, the beam adjuster optical element comprising a single lens including:
        an outer portion configured to receive an outer portion of the source light beam and to cause light rays of the outer portion of the source light beam to diverge in a corresponding outer portion of the adjusted light beam; and an inner portion configured to receive an inner portion of the source light beam and to cause light rays of the inner portion of the source light beam to converge in a corresponding inner portion of the adjusted light beam.

2. The optical system of claim 1, wherein the single lens comprises an outer portion having a negative optical power and an inner portion having a positive optical power.

3. The optical system of claim 1, wherein the beam adjuster optical element comprises an annular lenticular lens with an outer portion having a plano-concave shape and an inner portion having a plano-convex shape.

4. A luminaire, comprising:
a light source emitting a converging source light beam;
a beam adjuster optical element configured to receive the source light beam and to emit an adjusted light beam having a center to edge ratio in the range 3:1 to 7:1, the beam adjuster optical element comprising:
an outer portion configured to receive an outer portion of the source light beam and to cause light rays of the outer portion of the source light beam to diverge in a corresponding outer portion of the adjusted light beam; and
an inner portion configured to receive an inner portion of the source light beam and to cause light rays of the inner portion of the source light beam to converge in a corresponding inner portion of the adjusted light beam;
a movement system, the beam adjuster optical element mechanically coupled to the movement system, the movement system comprising a motor configured to move the beam adjustor optical element into and out of the source light beam; and
a control system electrically coupled to the motor and configured to receive a control signal via a data link and to move the beam adjustor optical element into and out of the source light beam in response to the control signal.

5. The luminaire of claim 4, wherein the luminaire comprises a projection optical system.

6. The optical system of claim 1, wherein the beam adjustor optical element is coupled to a movement system configured to move the beam adjustor optical element into and out of the source light beam.

7. The optical system of claim 6, wherein the movement system comprises an arm mechanically coupled to the beam adjustor optical element and to a motor, the motor configured to move the arm to move the beam adjustor optical element into and out of the source light beam.

8. The optical system of claim 6, wherein the movement system comprises a wheel mechanically coupled to the beam adjustor optical element and to a motor, the motor configured to rotate the wheel to move the beam adjustor optical element into and out of the source light beam.

9. The luminaire of claim 4, wherein the movement system comprises an arm mechanically coupled to the beam adjustor optical element and to the motor, the motor configured to move the arm to move the beam adjustor optical element into and out of the source light beam.

10. The luminaire of claim 4, wherein the movement system comprises a wheel mechanically coupled to the beam adjustor optical element and to the motor, the motor configured to rotate the wheel to move the beam adjustor optical element into and out of the source light beam.

\* \* \* \* \*